April 10, 1928.
A. J. BASTIAN
1,665,902
MOLDED ARTICLE
Filed Jan. 26, 1921
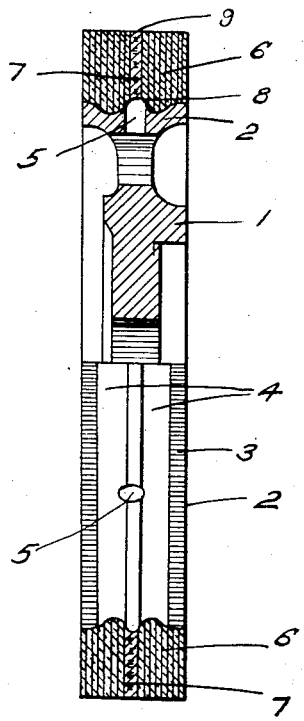
Fig. 1.
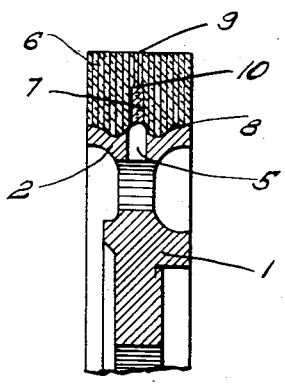 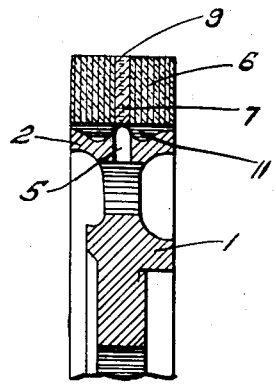
Fig. 2. Fig. 3.
WITNESSES:
INVENTOR
Arthur J. Bastian.
BY
Wesley G. Carr
ATTORNEY Patented Apr. 10, 1928.

1,665,902

UNITED STATES PATENT OFFICE.

ARTHUR J. BASTIAN, OF WILKINSBURG, PENNSYLVANIA, ASSIGNOR TO WESTINGHOUSE ELECTRIC & MANUFACTURING COMPANY, A CORPORATION OF PENNSYLVANIA.

MOLDED ARTICLE.

Application filed January 26, 1921. Serial No. 440,041.

This invention relates to molded materials, more particularly to machine elements, such as gears, pinions, friction wheels and the like formed of non-metallic materials, such as fabric or paper held together by a hardened binder.

The present invention is more closely related to various machine elements which are formed by providing a metal center or support, the peripheral surface of which is knurled and has grooves and openings therein. Sheets of material such as fabric or paper impregnated with a suitable binder, such as a phenolic condensation product, are placed on the peripheral surface of the metal support and consolidated thereon by heat and pressure. The resulting structure may be used without further machining or may be cut to form a gear or pinion.

Elements of this kind have desirable properties, especially since they are noiseless, tough, and weather-resisting. However, these elements, especially when formed of paper and a binder, are inclined to develop cracks along the laminations, generally in the central portions, thus virtually splitting the element into two parts. This, I have found, is due, in a large measure, to the strains set up in the molding operation, where the alternate heating and cooling produce strains which are greatest at the central portion of the molded body. These strains develop into cracks either during the molding operation, during the subsequent machining, or in the use of the element.

My present invention is designed to obviate this difficulty, it being among the objects thereof to provide an element formed of composite material on a metal support which is not subject to cracking.

In practising my invention, I provide a metal hub or support as heretofore, and assemble thereon a suitable number of laminations or layers of fibrous sheet material, such as paper or fabric, impregnated with a binder capable of hardening under heat and pressure, such as a phenolic condensation product. In the central portion of the layers of fibrous material, I place one or more layers or sheets of cork usually, but not necessarily, impregnated with a similar binder. The layer of cork usually extends from the surface of the support to the surface of the working portion but may terminate within the body of the composite material.

In the accompanying drawings forming a part hereof and which illustrate several embodiments of my invention, Fig. 1 is a cross-sectional view of a machine element molded on a metal support, some parts being shown in elevation;

Fig. 2 is a partial cross-sectional view of a modified form of machine element, and Fig. 3 a still further modified form of my invention.

I provide a metal hub or center 1, the peripheral surface or rim 2 of which is formed with knurls 3, a set of parallel grooves 4 and openings 5 leading from the rim 2 into the interior or hub portion of the support. Formed on the knurled surface 3 is a working portion 6 of composite material, usually fabric or paper and a hardened binder, anchored in the knurls 3 and grooves 4. One or more layers 7 of cork or similar resilient material is molded into the central portion of the composite working portion 6. Generally, the layers of cork extend from the surface 8 of the rim 2 out to the edge 9 of the working portion 6.

The layer or layers 7 of cork need not extend outwardly to the edge of the working portion but may terminate at any interior point 10 thereof, as shown in Fig. 2.

In Fig. 3 is shown a slightly modified form of my invention in which is added means for more securely anchoring the working portion 6 to the metal support 1. This is accomplished by providing a number of layers 11, generally of fabric impregnated with a binder, wound spirally upon the surface of the support 1, the body portion 6 being molded to the support carrying the additional layers of fabric.

By this means, I am enabled to provide a structure which practically prevents cracking due to the stresses set up in the structure during the molding operation, since the inherent resiliency of the cork material effectively absorbs the strains which otherwise would be set up in the composite material. Such strains are especially noticeable when paper is used, since paper does not flow with pressure, as does woven fabric. By providing additional anchoring means 11 consisting of spirally wound layers of fabric, I provide a better anchorage for the working portion and, at the same time, tend to lessen the stresses on the working portion due to the molding operation.

I claim as my invention:

1. A composite article comprising a metal support and a non-metallic working portion molded thereon, said working portion comprising fibrous sheet material spirally wound on the periphery of said support, fibrous sheet material helically wound on the periphery of said spirally wound material, and a single insert of resilient material disposed between some of the sheets.

2. A composite article comprising a metal support, and a non-metallic working portion molded thereon, said working portion comprising fibrous sheet material spirally wound on the periphery of said support, fibrous sheet material helically wound on the periphery of said spirally wound material, and a single insert of resilient material disposed between some of the sheets, said fibrous material and said insert being consolidated with a hardened binder.

3. A composite article comprising a metal support, and a non-metallic working portion molded thereon, said working portion comprising fibrous sheet material spirally wound on the periphery of said support, fibrous sheet material helically wound on the periphery of said spirally wound material, and a single insert of cork material disposed between some of the sheets, said fibrous material and said insert being consolidated with a hardened binder.

4. A composite article comprising a metal hub having a grooved outer periphery, and a non-metallic working portion molded thereon, said working portion comprising layers of fibrous sheet material wound spirally on said support to fill said grooves, other layers of fibrous material wound on edge on said first named layers and an insert of resilient material disposed on edge between some of said second named layers.

5. A composite article comprising a metal hub having a grooved outer periphery, and a non-metallic working portion molded thereon, said working portion comprising layers of fibrous sheet material wound on said support to fill said grooves, other layers of fibrous material wound on edge on said support, and an insert of resilient material disposed between some of said edgewound layers between the grooves of said hub, said fibrous material and said insert being consolidated with a hardened binder.

6. A composite article comprising a metal support, spirally wound layers of material on said support, a non-metallic working portion thereon and a cork insert in said working portion.

7. A composite article comprising a metal support, spirally-wound layers of fabric impregnated with a hardened binder on said support, a non-metallic working portion, comprising a plurality of layers of paper and a hardened binder, and a layer of cork in the central portion thereof.

In testimony whereof, I have hereunto subscribed my name this 20th day of January, 1921.

ARTHUR J. BASTIAN.